(12) United States Patent
Garg et al.

(10) Patent No.: US 7,827,166 B2
(45) Date of Patent: Nov. 2, 2010

(54) HANDLING DYNAMIC URLS IN CRAWL FOR BETTER COVERAGE OF UNIQUE CONTENT

(75) Inventors: Priyank S. Garg, San Jose, CA (US); Arnabnil Bhattacharjee, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 238 days.

(21) Appl. No.: 11/580,443

(22) Filed: Oct. 13, 2006

(65) Prior Publication Data

US 2008/0091685 A1 Apr. 17, 2008

(51) Int. Cl.
*G06F 17/30* (2006.01)
(52) U.S. Cl. ..................................... 707/709
(58) Field of Classification Search ................. 719/311; 707/709

See application file for complete search history.

(56) References Cited

U.S. PATENT DOCUMENTS

| | | | | |
|---|---|---|---|---|
| 7,200,677 B1* | 4/2007 | Allen et al. | ............... | 709/245 |
| 2003/0069803 A1* | 4/2003 | Pollitt | ................... | 705/26 |
| 2004/0172389 A1* | 9/2004 | Galai et al. | ............... | 707/3 |
| 2005/0081140 A1* | 4/2005 | Allen et al. | ............... | 715/501.1 |
| 2005/0216474 A1* | 9/2005 | Wiener | .................. | 707/10 |
| 2006/0026194 A1* | 2/2006 | Bhushan et al. | ........... | 707/102 |
| 2006/0070022 A1* | 3/2006 | Ng et al. | .................. | 717/104 |
| 2006/0129463 A1* | 6/2006 | Zicherman | ................ | 705/26 |
| 2006/0218143 A1* | 9/2006 | Najork | ..................... | 707/6 |
| 2006/0248066 A1* | 11/2006 | Brewer | ..................... | 707/4 |
| 2007/0106676 A1* | 5/2007 | Allen et al. | ............... | 707/10 |
| 2008/0140626 A1* | 6/2008 | Wilson | ..................... | 707/3 |

FOREIGN PATENT DOCUMENTS

| | | | | |
|---|---|---|---|---|
| JP | | 2006215735 A | * | 8/2006 |
| WO | WO | 2004008340 A1 | * | 1/2004 |

OTHER PUBLICATIONS

Cho, Efficient Crawling through URL ordering, 1998, p. 161-162.*
Brain, How Web Servers and the Internet Work, 2001, pp. 1-8.*

(Continued)

*Primary Examiner*—James Trujillo
*Assistant Examiner*—Albert Phillips
(74) *Attorney, Agent, or Firm*—Hickman Palermo Truong & Becker LLP; Christian A. Nicholes; Daniel D. Ledesma

(57) ABSTRACT

Techniques for identifying duplicate webpages are provided. In one technique, one or more parameters of a first unique URL are identified where each of the one or more parameters do not substantially affect the content of the corresponding webpage. The first URL and subsequent URLs may be rewritten to drop each of the one or more parameters. Each of the subsequent URLs is compared to the first URL. If a subsequent URL is the same as the first URL, then the corresponding webpage of the subsequent URL is not accessed or crawled. In another technique, the parameters of multiple URLs are sorted, for example, alphabetically. If any URLs are the same, then the webpages of the duplicate URLs are not accessed or crawled.

24 Claims, 2 Drawing Sheets

OTHER PUBLICATIONS

Brain, How CGI Scripting Works 2001, pp. 1-11.*
Lee, On URL Normalization, 2005, pp. 1076-1085.*
Schonfeld, Do not Crawl in the DUST: Different URLs with Simialar Text Extended Abstract, May 2006, pp. 1-2.*
Schonfeld, Do Not Crawl in the DUST: Different URLs with Similar Text, Research Thesis, Feb. 2006, pp. 1-58.*
Slawski, Solving Different URLs with Similar Text (DUST), Sep. 4, 2006, pp. 1-5.*
Freitag, Google Sitemaps Protocol, 2005, pp. 1-5.*

* cited by examiner

HANDLING DYNAMIC URLS IN CRAWL FOR BETTER COVERAGE OF UNIQUE CONTENT

FIELD OF THE INVENTION

This application relates generally to web crawling and, more specifically, to handling dynamic URLs more efficiently to better utilize crawl bandwidth by fetching more unique content per fetch.

BACKGROUND

A web crawler is a program or automated script which browses the World Wide Web (WWW) in an automated manner. Web crawlers are used for various purposes, the most popular of which is to identify and index as much available information on the World Wide Web as possible and provide the information to the general public through a search engine, such as the search engine provided by Yahoo!™. One way to browse the WWW is to begin at one or more webpages and follow the hyperlinks (referred to herein as "links") contained within each webpage by loading the webpages corresponding to the links. The links are uniform resource locators (URLs) that allow the webpage, identified by the link, to be accessed. A webpage may be accessed through one or more URLs but one URL can be used to access at most one webpage.

One way for web crawlers to retrieve as much information as possible is to only "crawl" webpages that provide unique content, i.e., content relating to a website that has not already been indexed and/or up-dated. However, some web crawlers assume that a unique URL corresponds to a unique webpage. This is not always the case.

A dynamic URL is a URL of a Web page with content that depends on variable parameters that are provided to the server that delivers the content. The parameters may be already present in the URL itself or they may be the result of user input.

A dynamic URL typically results from search of a database-driven website or the URL of a website that runs a script. In contrast to static URLs, in which the contents of the webpage do not change unless the changes are coded into the HTML, dynamic URLs are typically generated from specific queries to a website's database. The webpage has some fixed content and some part of the webpage is a template to display the results of the query, where the content comes from the database that is associated with the website. This results in the page changing based on the data retrieved from the database per the dynamic parameter. Dynamic URLs often contain the following characters: ?, &, %, +, =, $, cgi. An example of a dynamic URL may be something like the following: http://www.amazon.com/store?prod=camera&brand=sony&sessionid=7ek138dje72931d91ds.

However, sometimes a parameter in a dynamic URL may not result in modifying the page content in any way. One of the parameters of the example dynamic URL above is sessionid followed by a corresponding value that is unique to a user. The "sessionid" parameter is used by the website to track the user during a particular session in order to tailor the user's experience based on knowledge obtained about what actions the user has made during the session. The "sessionid" may be inserted into the URL as a result from a user registering and logging into the website. Another parameter similar to sessionid parameter is the source tracker parameter. Like the sessionid parameter, the source tracker parameter has no effect on the content of webpage; it is only used for logging traffic sources to the webpage.

To current web crawlers the above dynamic URL is different than http://www.amazon.com/store?prod=camera&brand=sony&sessionid=2k4gd03k9sx1zc8d. However, the only difference between the URLs is the sessionid. The content provided on each corresponding webpage is identical (i.e., information about Sony cameras) except for perhaps a graphic or text that identifies the user. For the purposes of search results, the two webpages are referred to as "duplicates."

Another example of duplicate webpages is a webpage that displays contents of a table and another webpage that sorts the contents of the table differently, according to certain criteria. There may be multiple criteria in which the contents of the table may be sorted. Although the contents of each webpage are displayed differently and the URLs are different, the overall content of each webpage is substantially identical. Thus, there may be hundreds of duplicate webpages that each provide the same particular content. A web crawler may unintentionally index all such duplicates.

One approach for a web crawler is to intelligently analyze a particular webpage and compare the particular webpage against other webpages to determine whether the content of the particular webpage is truly unique. However, such an approach is still prone to error (i.e., not all duplicates are identified as duplicates). Furthermore, a significant amount of resources are consumed by simply accessing the webpages, much less performing the comparisons. By wasting time accessing multiple webpages of a website, that time may not be used accessing other valid, non-duplicate webpages.

To illustrate, a web crawler is limited to a certain number of fetches (e.g., HTTP GET requests) that the web crawler can make within a given period of time. A web server that hosts a website is also limited in the number of fetches it can handle. Web crawlers cannot accept every URL of every single website because some websites have millions of webpages with their own corresponding URLs. Thus, a web crawler should make intelligent decisions about which webpages to access.

Another approach for a web crawler is to implement strict rules to handle dynamic URLs in order to avoid accessing duplicates. For example, a web crawler may only access a small number of webpages with "similar looking" URLs. As another example, a web crawler may not access URLs that are greater than a certain number of characters in order to avoid URLs with session identifiers. However, such measures prevent web crawlers from accessing a significant amount of unique content.

Another approach for handling dynamic URLs is for webmasters to modify their respective websites to avoid dynamic URLs or to rewrite dynamic URLs to make them appear static so that Web crawlers will crawl the entirety of their respective websites. Webmasters of websites typically desire lots of user traffic to their respective websites in order to generate advertisement revenue. Accordingly, webmasters want web crawlers to crawl all relevant webpages on their respective websites. However, because of web crawler difficulties in handling dynamic URLs, webmasters must spend a considerable amount of time modifying their respective websites.

Therefore, there is a need to more efficiently handle dynamic URLs in order to avoid unnecessarily accessing duplicate webpages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
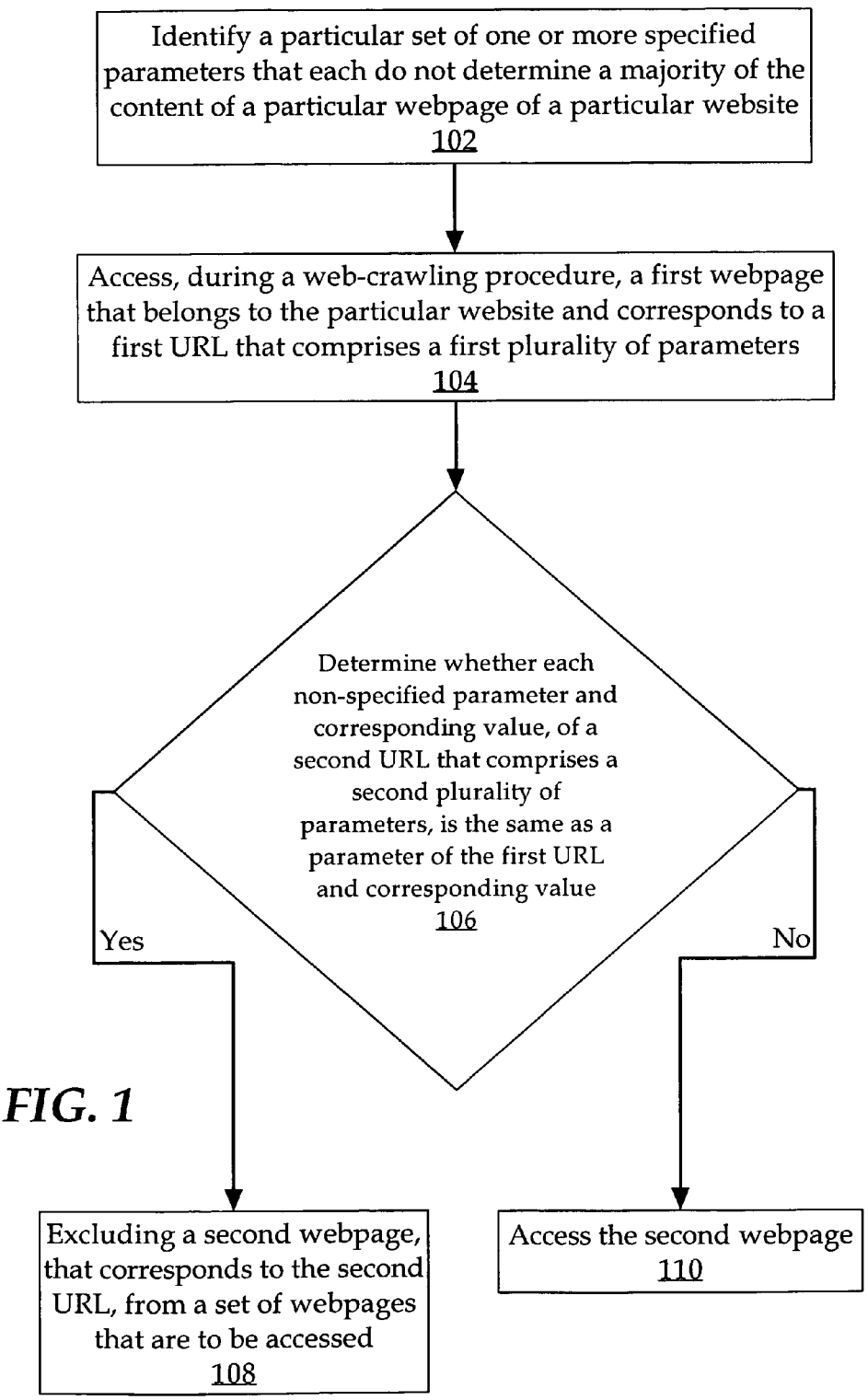
FIG. 1 is a flow diagram that illustrates how accessing duplicate content may be avoided, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to avoid accessing and crawling duplicate webpages, techniques for determining dynamic URLs that return duplicate content are provided. According to one approach, URLs are rewritten to drop parameters that have little or no effect on the content of the corresponding webpages. Such parameters are hereinafter referred to as "superfluous parameters". Hereinafter a "parameter" refers to only the parameter's key and not also the value associated with that key. For example, given the dynamic URL described above, "prod=sony" comprises the parameter "prod" and the key value "sony". Various techniques for identifying superfluous parameters are described below.

Once the superfluous parameters (and their corresponding key values) are dropped, the modified URLs may be compared with each other. For example, a first URL is modified by deleting the superfluous parameters and corresponding key values. Subsequent URLs (e.g., from the same website) are also modified by deleting superfluous parameters and corresponding key values. The modified subsequent URLs are compared to the first modified URL. If any of the modified subsequent URLs are the same, then a webpage that corresponds to the URL is not accessed. If any of the modified subsequent URLs are not the same, then the webpage that corresponds to the URL is accessed and crawled.

According to another approach, the parameters of URLs are sorted before the corresponding webpages are accessed. If the sorted parameters of a particular URL are the same as the sorted parameters of another URL, then the particular URL is not accessed.

Rewriting Dynamic URLs

According to an embodiment of the invention, superfluous parameters are identified in order to avoid characterizing content as unique when the content is, in fact, not unique. Multiple ways of identifying superfluous parameters are described in the sections below.

A first webpage that corresponds to a first URL may be determined to have unique content. Such a determination may be performed by identifying parameters of the first URL as being superfluous based on one or more rules associated with the website to which the first URL belongs. For example, one such rule may be that of URLs of a particular website, a "sid" parameter contained therein are superfluous.

When determining whether other URLs of the same website provide the same content as the first URL, the other URLs may be compared to the first URL and/or to a modified version of the first URL. Such a modified version is referred to hereinafter as the "canonical form" of the original URL. A canonical URL may simply be the same as the original URL except that the superfluous parameters and corresponding key values are deleted. For example, an original dynamic URL may be something like the following:

http://www.amazon.com/store?prod=camera&brand=sony&sessionid=2k4gd03k9sx1zc8d.

The canonical form of the above URL may be http://www.amazon.com/store?prod=camera&brand=sony.

Thus, each subsequent URL to the first URL may be compared to the canonical form of the first URL. Furthermore, the canonical form of each subsequent URL may be compared to the canonical form of the first URL. In order for the canonical form of each subsequent URL to be compared to the canonical form of the first URL, then the rules that were applied to the first URL are also applied to each subsequent URL.

One way to compare a subsequent URL to the canonical form of the first URL without applying the rules to the subsequent URL is by determining whether each parameter in the canonical form of the first URL is found in the subsequent URL. If so, then the webpage that corresponds to the subsequent URL may provide the same or substantially the same content as the webpage that corresponds to the first URL.

FIG. 1 is a flow diagram that illustrates how accessing duplicate content (e.g., by a web crawling mechanism) may be avoided, according to an embodiment of the invention. In step 102, a particular set of one or more parameters is identified, e.g. based on set of rules for a particular website. Each parameter in the particular set is a superfluous parameter. In step 104, a first webpage is accessed during a web-crawling procedure. The first webpage belongs to the particular website and corresponds to a first URL that comprises a first plurality of parameters. In step 106, a second URL is compared to the first URL. Each non-superfluous parameter and value of the second URL may be compared to the corresponding (non-superfluous) parameter and value of the first URL. If each corresponding non-superfluous parameter and value is the same, then the process proceeds to step 108 where the webpage, corresponding to the second URL, is excluded from a set of webpages that are to be accessed. If at least one corresponding non-superfluous parameter and value is not the same, then the process proceeds to step 110 where the webpage that corresponds to the second URL is accessed.

Another way to view this problem of accessing and examining duplicate webpages is to recognize that different websites may have different rules applied to their respective URLs. Traditionally, a single set of global rules is applied to each URL regardless of the website to which the URL belongs. However, a single set of global rules does not account for website-specific circumstances and, thus, a single set of global rules does not apply in all cases. For example, a parameter on a first website may be superfluous, while the same parameter on a second website may not be. Therefore, neglecting to crawl the second website may result in overlooking a significant amount of unique content.

In one embodiment, the parameters of the first URL, or the canonical form of the first URL, are sorted (e.g., alphabetically). The parameters of each subsequent URL are also sorted before each subsequent URL is compared with the first URL (or canonical form of the first URL). Such sorting may improve the time required to compare non-superfluous parameters. In a similar embodiment, the canonical form of a particular URL is not only a URL without superfluous parameters, but also one whose non-superfluous parameters are sorted.

In one embodiment, a hash is generated from the canonical form of a first URL. A hash may then be generated for each subsequent URL that is compared to the first URL. Thus, instead of comparing strings, hash values may be compared to determine that two URLs are identical.

One of the benefits of identifying duplicate webpages by identifying superfluous parameters is the improved ranking of webpages. For example, there may be 1000 different URLs that correspond to 1000 webpages that each provides substantially the same content. Therefore, each of the 1000 URLs is assigned a separate ranking. By determining that all of the 1000 URLs link to webpages that provide substantially the same content, a single ranking is determined for a single webpage that is representative of all the webpages. Thus, before a web-crawling procedure, a first webpage is associated with a page ranking. If a second webpage is excluded from a set of webpages that are to be accessed during the web-crawling procedure, then the page ranking associated with the first webpage is modified. Such a method more accurately ranks webpages and provides a clearer picture of which content is linked to the most. In the past, a webpage was a good proxy for identifying unique content. However, with dynamic URLs, that proxy model breaks down. With a more accurate ranking, users are better able to determine the popularity and/or trustworthiness of particular content. The more accurate ranking may also be used by a search engine that, based on Web queries, 1) takes into account the ranking of relevant webpages and 2) returns the corresponding URLs.

Another benefit of identifying duplicate webpages by identifying parameters as superfluous is that more unique content may be found and indexed by a Web crawler. Because less duplicate webpages are accessed and analyzed, a Web crawler has more time to access and analyze additional unique content provided by other websites (i.e., comprehensiveness). Additionally, a Web crawler has more time to access and analyze unique content provided by websites that the Web crawler already crawls (i.e., freshness).

Another benefit that may be realized by embodiments of the invention is that there may be a reduced load on web servers. Because duplicate webpages are not accessed, a Web crawler will not issue unnecessary fetch requests to multiple web servers, which may significantly reduce the number of fetch requests that such web servers must handle.

Displaying Rewritten URLs

In one embodiment, if a Web query is submitted by a user and at least one of the URLs that satisfy the query is a dynamic URL with one or more superfluous parameters, then the dynamic URL is rewritten and the rewritten URL is displayed in the search engine results page (SERP). One way in which the dynamic URL may be rewritten is by displaying the canonical form of the dynamic URL (i.e., without the one or more superfluous parameters and corresponding key values). For example, if the dynamic URL that satisfies the Web query is http://www.amazon.com/store?prod=camera&brand= sony&sessionid=7ek138dje72931d91ds, then the dynamic URL is displayed in the SERP as http://www.amazon.com/store?prod=camera&brand=sony.

However, in some situations, the canonical form of a dynamic URL may not be recognized by the one or more servers that host the corresponding website. Therefore, the actual link to the corresponding webpage may be the original (i.e., unmodified) dynamic URL.

Furthermore, the canonical form may be used as a uniquing hash so that only one of many possible similar forms is displayed in the SERP. This may reduce the amount of perceived duplicate content that the user will see.

Receiving Input from the Website Owner

According to one embodiment, superfluous parameters of a set of URLs are identified based on input received from, e.g., a website owner or a webmaster of a particular website. Any mechanism may be used for receiving input from a webmaster. For example, a webmaster may access a particular webpage provided by the entity that owns the web crawler. The webmaster enters the superfluous parameters and may provide information that verifies that the webmaster has authority to modify the website.

The web crawler may validate that the parameters entered by the webmaster or website owner are indeed superfluous. If the webmaster or website owner is incorrect in identifying a parameter as superfluous, then the web crawler may miss a substantial amount of unique content. One way in which the web crawler may validate that a particular parameter is superfluous is by trying different key values for the particular parameter. If different key values for the particular parameter are used to access webpages and the webpages have substantially the same content, then the particular parameter is validated as superfluous. The superfluous parameters may be validated periodically based on the fact that websites (and the tools they use) may change and, therefore, superfluous parameters might also change.

Site-Based Analysis

According to one embodiment, superfluous parameters of a set of URLs of a website are identified based on analysis of two or more URLs of the website. After a first webpage and a second webpage of a website are analyzed, the first and second webpages are compared to each other. If the contents of the first and second webpages are substantially similar (e.g., a majority of the content of each webpage is duplicated on the other webpage), then the parameters of the URLs are compared. Any parameters that are different between the two URLs are likely candidates as superfluous parameters.

The web crawler may validate that the parameters that have been identified are indeed superfluous. The validation process may occur periodically.

Tool-Based Analysis

According to one embodiment, superfluous parameters of a set of URLs are identified based on an analysis of the tools used by one or more web servers that host a particular website. A few common web servers include Apache HTTP Server, Internet Information Systems (IIS), Sun Java System Web Server, and WebSphere. Many web servers use similar tools to serve traffic and/or generate content. For example, one common web server tool generates a source tracker parameter that indicates the source of a particular HTTP request. As described above, the source tracker parameter is another example of a superfluous parameter. By gathering and storing information about superfluous parameters generated by at least the most common web server tools, the superfluous parameters, of URLs of websites that use such web server tools, may be identified.

The tools of a website may be identified in a variety ways. As one example, many web servers implement java servlets, which provide a well defined API called HttpSession. A possible technique would be to investigate the default implementations for such web servers and recognize them by markers in the dynamic URLs. For example, in Tomcat, the default session identifier is typically a parameter named "jsessionid" with a value that is a 16 byte hash. The following is an actual dynamic URL with a Tomcat session identifier:

http://www.uvine.com/uvinedirect/insecure/retail/sp/
loadWine?wine_name=Fourcas%20Dup re;jsessionid=
B418CC0FC3D09382063AED507DB14746. The value of the paraemeter "jsessionid" is a 16 byte hash value represented by 32 alphanumeric characters expressed in hexadecimal.

Similarly, with the above modes of identifying superfluous parameters, the superfluous parameters of a particular website may be validated periodically due to the fact that web server tools of a website may change and, therefore, superfluous parameters of the website might also change.

Sorting Parameters in a URL

According to one embodiment, duplicate webpages are identified by sorting parameters of a URL. Many times the order of parameters is not preserved in HTTP. Also, many web servers do not maintain a consistent order of parameters. For example, a web server may provide the following dynamic URL http://www.amazon.com/
store?prod=camera&brand=sony to one user and the following dynamic URL http://www.amazon.com/
store?brand=sony&prod=camera to another user. The only difference between the first URL and the second URL is the order of the parameters. Although the URLs are not identical (and therefore are considered different URLs by web crawlers), the corresponding webpages have identical content, because at least some web servers handle parameters without regard to the order of the parameters in the URL.

Therefore, to identify such URLs, the parameters are first sorted, e.g., alphabetically. Any technique for sorting parameters may be used. Embodiments of the invention are not limited to any such technique. As an example of sorting alphabetically, if the first URL of the website is http://www.amazon.com/
store?brand=sony&prod=camera then that URL is stored without being sorted, since the parameters are already sorted alphabetically. Then, when the following URL from the same website is identified, http://www.amazon.com/
store?prod=camera&brand=sony this URL becomes http://www.amazon.com/
store?brand=sony&prod=camera This sorted URL is compared with the first URL. Because the two URLs are the same, the webpage, corresponding to the second URL, is not accessed.

Hardware Overview

Figure 2:
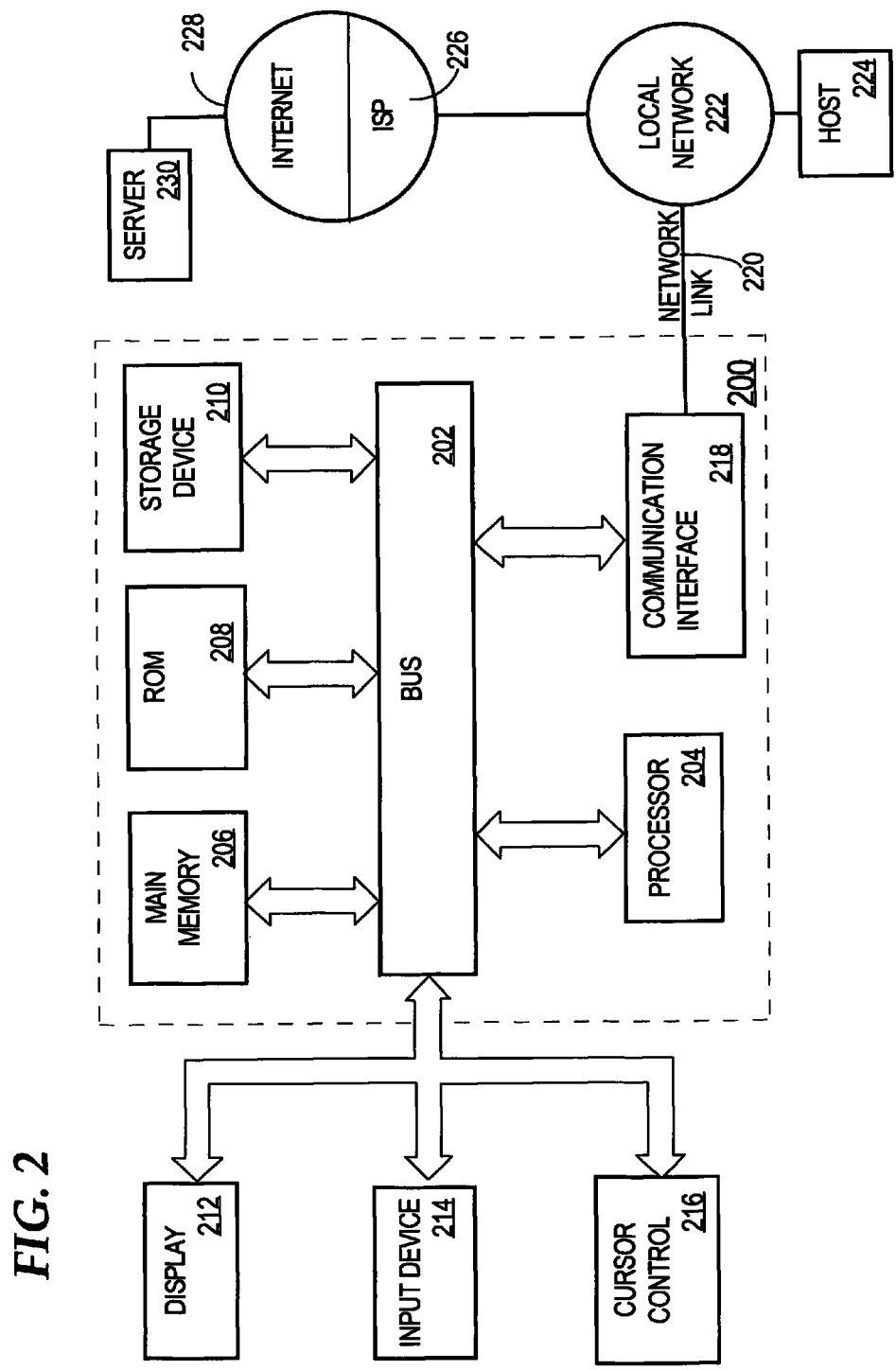
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
   identifying a particular set of one or more specified parameters that each do not determine a majority of the content of a particular webpage of a particular website;
   wherein identifying said particular set of one or more parameters includes:
      identifying one or more tools that are used, by one or more servers that host said particular website, to generate URLs for said particular website; and
      based on the identity of the one or more tools, identifying said particular set;
   during a web-crawling procedure, accessing a first webpage that belongs to said particular website, wherein said first webpage corresponds to a first uniform resource locator (URL) that comprises a first plurality of parameters;
   determining whether each non-specified parameter and corresponding value, of a second URL that comprises a second plurality of parameters, matches a non-specified parameter and corresponding value of said first URL;
   if each non-specified parameter and corresponding value of the second URL-matches a non-specified parameter and corresponding value of said first URL, then excluding, from a set of webpages that are to be accessed during said web-crawling procedure, a second webpage to which said second URL refers;
   if each non-specified parameter and corresponding value of the second URL does not match a non-specified parameter and corresponding value of said first URL, then including said second webpage in said set of webpages; and
   accessing said second webpage during said web-crawling procedure only if said set of webpages includes said second webpage;
   wherein the steps are performed by one or more computing devices.

2. The method of claim 1, wherein:
   the particular set of one or more specified parameters is a plurality of specified parameters;
   identifying said particular set includes identifying at least one parameter in said plurality of specified parameters by:
      identifying that each webpage of a plurality of webpages, that belong to said particular website, has substantially the same content as each other webpage in said plurality of webpages;
      comparing a particular URL, that corresponds to a particular webpage of said plurality of webpages, with each other URL that corresponds to another webpage of said plurality of webpages; and
      determining that a value of said at least one parameter of said particular URL is different than the value of each corresponding parameter of said each other URL.

3. A computer-readable storage medium storing one or more sequences of instructions which, when executed by one or more processors, causes the one or more processors to perform the method recited in claim 2.

4. The method of claim 1, wherein determining whether each non-specified parameter and corresponding value of said second URL matches a non-specified parameter and corresponding value of said first URL, includes:

deleting each specified parameter from said first URL to create a modified first URL;
deleting each specified parameter from said second URL to create a modified second URL;
comparing said modified second URL with said modified first URL.

5. The method of claim 4, further comprising:
generating a first hash value, based on said modified first URL;
generating a second hash value, based on said modified second URL;
wherein comparing said modified second URL with said modified first URL includes comparing said second hash value with said first hash value.

6. A computer-readable storage medium storing one or more sequences of instructions which, when executed by one or more processors, causes the one or more processors to perform the method recited in claim 5.

7. The method of claim 4, further comprising:
receiving a query from a user;
determining that content contained in the first webpage satisfies said query;
in response to said query, providing a results page to said user, wherein said results page includes said modified first URL.

8. A computer-readable storage medium storing one or more sequences of instructions which, when executed by one or more processors, causes the one or more processors to perform the method recited in claim 7.

9. A computer-readable storage medium storing one or more sequences of instructions which, when executed by one or more processors, causes the one or more processors to perform the method recited in claim 4.

10. The method of claim 1, wherein:
said first webpage is associated with a page ranking before said web-crawling procedure;
and
the method further comprising, if said second webpage is excluded from said set of webpages, then modifying said page ranking to more accurately reflect the popularity of the content of the first webpage.

11. A computer-readable storage medium storing one or more sequences of instructions which, when executed by one or more processors, causes the one or more processors to perform the method recited in claim 10.

12. The method of claim 1, wherein:
said particular website is to be accessed a first number of times; and
the method further comprising, if said second webpage is excluded from said set of webpages, then determining a second number of times said particular website is to be accessed, wherein the second number of times is less than the first number of times.

13. A computer-readable storage medium storing one or more sequences of instructions which, when executed by one or more processors, causes the one or more processors to perform the method recited in claim 12.

14. The method of claim 1, wherein determining whether each non-specified parameter and corresponding value of said second URL matches a non-specified parameter and corresponding value of said first URL, includes:
sorting, based on first criteria, the first plurality of parameters of the first URL; and
sorting, based on said first criteria, the second plurality of parameters of the second URL.

15. A computer-readable storage medium storing one or more sequences of instructions which, when executed by one or more processors, causes the one or more processors to perform the method recited in claim 14.

16. The method of claim 1, wherein:
the first URL and the second URL belong to a first website;
a first set of rules is associated with the first website;
the method further comprising using the first set of rules for identifying each non-specified parameter of the first URL and the second URL;
a third URL and a fourth URL belong to a second website that is different than the first website;
a second set of rules is associated with the second website;
the second set of rules is different than the first set of rules;
the method further comprising using the second set of rules for identifying each non-specified parameter of the third URL and the fourth URL.

17. A computer-readable storage medium storing one or more sequences of instructions which, when executed by one or more processors, causes the one or more processors to perform the method recited in claim 16.

18. A computer-readable storage medium storing one or more sequences of instructions which, when executed by one or more processors, causes the one or more processors to perform the method recited in claim 1.

19. The method of claim 1, wherein the particular set of one or more specified parameters is identified without analyzing the content of any webpages of the website to which the first webpage and the second webpage belong.

20. A computer-readable storage medium storing one or more sequences of instructions which, when executed by one or more processors, causes the one or more processors to perform the method recited in claim 19.

21. The method of claim 1, wherein:
the particular set of one or more specified parameters is a plurality of specified parameters;
identifying said particular set of one or more parameters includes receiving, from a webmaster of the particular website, information that identifies one or more of said plurality of specified parameters.

22. A computer-readable storage medium storing one or more sequences of instructions which, when executed by one or more processors, causes the one or more processors to perform the method recited in claim 21.

23. The method of claim 1, wherein:
the one or more tools includes a particular tool;
the method further comprises the step of, in response to identifying the particular tool and before identifying the particular set of one or more specified parameters, determining that the particular tool generates a source tracker parameter that indicates a source of a particular HTTP request; and
identifying the particular set of one or more specified parameters comprises determining that the source tracker parameter is a parameter in the particular set.

24. A computer-readable storage medium storing one or more sequences of instructions which, when executed by one or more processors, causes the one or more processors to perform the method recited in claim 23.

* * * * *